(12) United States Patent
Saikawa et al.

(10) Patent No.: US 12,175,554 B2
(45) Date of Patent: Dec. 24, 2024

(54) GUIDANCE SYSTEM AND GUIDANCE METHOD

(71) Applicant: Mitsubishi Electric Corporation, Tokyo (JP)

(72) Inventors: Yoshinori Saikawa, Tokyo (JP); Sayaka Kobayashi, Tokyo (JP); Kazufumi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 248 days.

(21) Appl. No.: 17/973,540

(22) Filed: Oct. 26, 2022

(65) Prior Publication Data

US 2023/0046952 A1    Feb. 16, 2023

Related U.S. Application Data

(63) Continuation of application No. PCT/JP2020/027268, filed on Jul. 13, 2020.

(51) Int. Cl.
G06Q 90/00    (2006.01)

(52) U.S. Cl.
CPC .................. *G06Q 90/20* (2013.01)

(58) Field of Classification Search
CPC .................................................. G06Q 90/20
See application file for complete search history.

(56) References Cited

U.S. PATENT DOCUMENTS

2013/0268148 A1* 10/2013 Kondo ................ B61L 27/40
                                                                         701/19
2022/0066438 A1*  3/2022 Higashi ............... G05D 1/0212

FOREIGN PATENT DOCUMENTS

| AU | 2014214533 A1 | 9/2015 |
|---|---|---|
| EP | 3437955 A1 | 2/2019 |
| JP | 2001-354138 A | 12/2001 |
| JP | 2010-171658 A | 8/2010 |
| JP | 2013-116676 A | 6/2013 |
| WO | 2012/086000 A1 | 6/2012 |
| WO | 2017/169068 A1 | 10/2017 |

OTHER PUBLICATIONS

Office Action issued Feb. 23, 2024 in European Patent Application No. 20 945 421.4, 7 pages.

(Continued)

*Primary Examiner* — Seth A Silverman
(74) *Attorney, Agent, or Firm* — XSENSUS LLP

(57) ABSTRACT

A guidance system includes: a station congestion estimating unit to estimate congestion situations in respective areas in a station and to output station congestion information indicating the estimated congestion situations in the respective areas in the station; a guidance determining unit to determine a mode of guiding station users on the basis of the station congestion information output by the station congestion estimating unit and to output guidance information indicating the mode that has been determined; and an output generation unit to generate an output signal for guiding the station users on the basis of the guidance information output by the guidance determining unit, to output the output signal that has been generated to an output device, and to cause the output device to provide output corresponding to the output signal.

2 Claims, 2 Drawing Sheets

(56) References Cited

OTHER PUBLICATIONS

Extended European Search Report issued Jun. 22, 2023, in corresponding European Patent Application 20945421.4.
International Search Report and Written Opinion mailed on Sep. 24, 2020, received for PCT Application PCT/JP2020/027268, filed on Jul. 13, 2020, 8 pages including English Translation.
Notice of Reasons for Refusal mailed on Jan. 12, 2021, received for JP Application 2020-563733, 7 pages including English Translation.

* cited by examiner

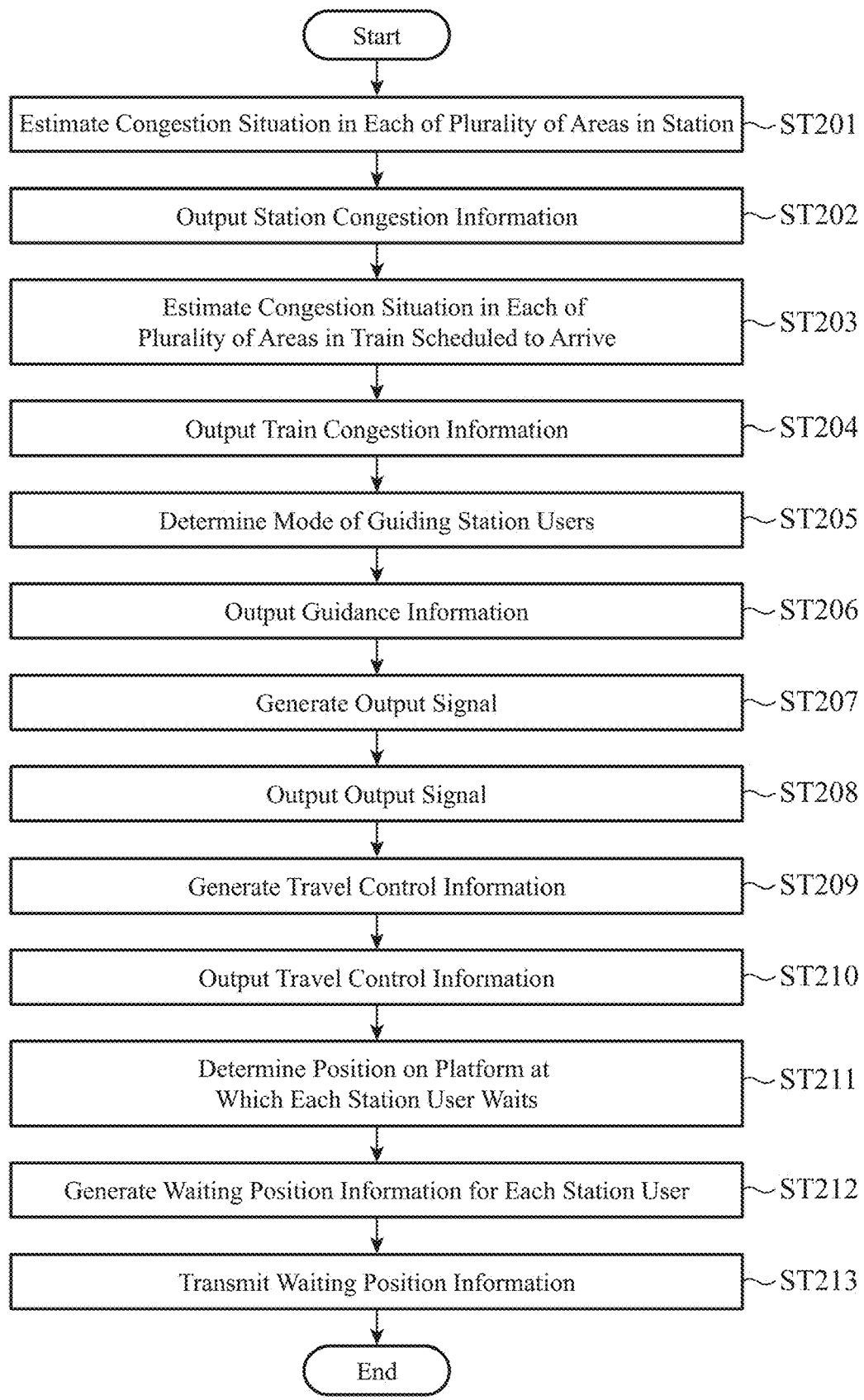

GUIDANCE SYSTEM AND GUIDANCE METHOD

CROSS-REFERENCE TO RELATED APPLICATION

The present application is a continuation of International Patent Application No. PCT/JP2020/027268, filed Jul. 13, 2020, the entire contents of which are incorporated herein by reference.

TECHNICAL FIELD

The present disclosure relates to a guidance system and a guidance method.

BACKGROUND ART

There is technology of estimating a congestion situation in a station by estimating the number of people alighting from a train (see, for example, Patent Literature 1.).

CITATION LIST

Patent Literature

Patent Literature 1: WO 2017/169068 A

SUMMARY OF INVENTION

Technical Problem

However, since it is not possible to suppress the confusion of station users in the station only by estimating the congestion situation in the station, there may occur cases where station users collide with each other, or fall due to the collision.

The present disclosure is intended to solve the above problem, and an object of the present disclosure is to provide a guidance system capable of suppressing confusion of station users in a station.

Solution to Problem

A guidance system of the present disclosure includes: station congestion estimating circuitry to estimate congestion situations in respective areas in a station and to output station congestion information indicating the estimated congestion situations in the respective areas in the station; guidance determining circuitry to determine a mode of guiding a station user on a platform on the basis of the station congestion information output by the station congestion estimating circuitry and to output guidance information indicating the mode that has been determined; output generation circuitry to generate an output signal for guiding the station user on the platform on the basis of the guidance information output by the guidance determining circuitry, to output the output signal that has been generated to an output device, and to cause the output device to provide output corresponding to the output signal; and train congestion estimating circuitry to estimate congestion situations in respective areas of a train scheduled to arrive at the station and to output train congestion information indicating the estimated congestion situations in the respective areas of the train, in which the guidance determining circuitry determines the mode of guiding the station user on the platform on a basis of the station congestion information output by the station congestion estimating circuitry and the train congestion information output by the train congestion estimating circuitry and outputs the guidance information indicating the mode that has been determined.

Advantageous Effects of Invention

According to the present disclosure, it is possible to suppress confusion of station users in a station.

BRIEF DESCRIPTION OF DRAWINGS

FIG. 2 is a flowchart illustrating an example of processing of the guidance system according to the first embodiment.

DESCRIPTION OF EMBODIMENTS

Figure 1:
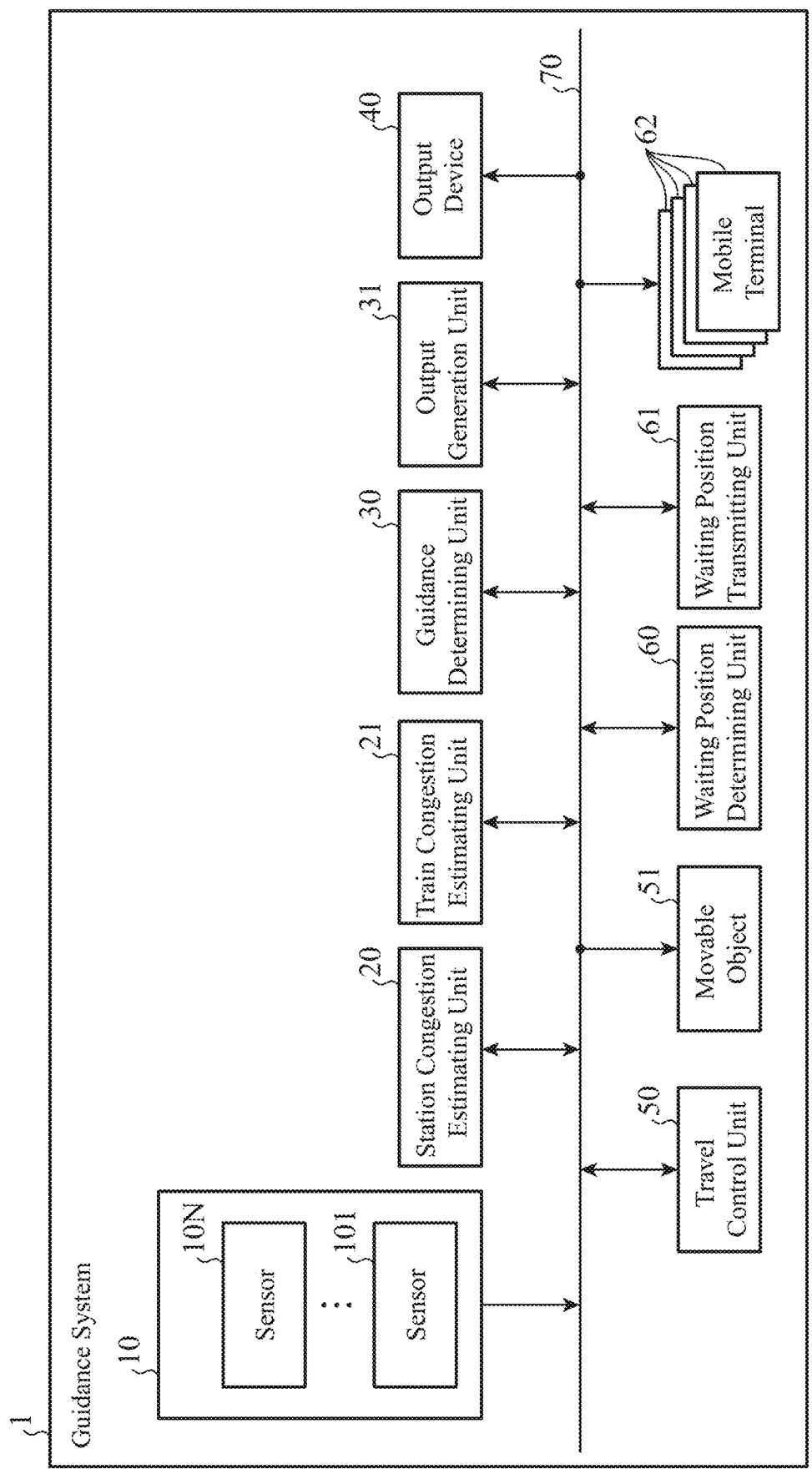
FIG. 1 is a block diagram illustrating an example of the configuration of the main part of a guidance system according to a first embodiment.

Hereinafter, an embodiment of the present disclosure will be described in detail by referring to the drawings.

First Embodiment

A guidance system 1 according to a first embodiment will be described with reference to FIGS. 1 and 2.

The configuration of the main part of the guidance system 1 according to the first embodiment will be described with reference to FIG. 1.

FIG. 1 is a block diagram illustrating an example of the configuration of the main part of the guidance system 1 according to the first embodiment.

The guidance system 1 includes sensors 10, a station congestion estimating unit 20, a train congestion estimating unit 21, a guidance determining unit 30, an output generation unit 31, an output device 40, a travel control unit 50, a movable object 51, a waiting position determining unit 60, a waiting position transmitting unit 61, and mobile terminals 62.

The sensors 10, the station congestion estimating unit 20, the train congestion estimating unit 21, the guidance determining unit 30, the output generation unit 31, the output device 40, the travel control unit 50, the movable object 51, the waiting position determining unit 60, the waiting position transmitting unit 61, and the mobile terminals 62 included in the guidance system 1 are connected to each other via a network 70 capable of transmitting and receiving information.

Examples of the network 70 include a wireless communication network such as a wireless local area network (LAN), long term evolution (LTE), or Bluetooth (registered trademark) (BT), and a wired communication network such as a wired LAN or a signal line that performs communication using a predetermined protocol.

Note that the train congestion estimating unit 21, the travel control unit 50, the movable object 51, the waiting position determining unit 60, the waiting position transmitting unit 61, and the mobile terminals 62 are not essential components for the guidance system 1.

In the first embodiment, the guidance system 1 will be described as including the train congestion estimating unit 21, the travel control unit 50, the movable object 51, the waiting position determining unit 60, the waiting position transmitting unit 61, and the mobile terminals 62.

A sensor 10 is an imaging device such as a monitoring camera that captures an image of a predetermined area in a station. The sensor 10 is not limited to an imaging device and may be a three-dimensional (3D) LiDAR device or the like that detects an object present in a predetermined area in the station. Furthermore, for example, the sensor 10 may be a weight sensor that detects a weight in a predetermined area in the station. Furthermore, for example, the sensor 10 may be an automatic ticket gate provided at a ticket gate that manages entry to and exit from the station.

The sensors 10 output sensor information.

Specifically, for example, in a case where a sensor 10 is an imaging device, the sensor 10 outputs image information indicating a captured image as sensor information.

As illustrated in FIG. 1, the guidance system 1 includes a plurality of sensors 101, ..., and 10N (N is a natural number greater than or equal to 2). For example, in a case where the sensors 101, ..., and 10N are imaging devices, each of the plurality of sensors 101, ..., and 10N captures an image of a predetermined area in the station.

The station congestion estimating unit 20 estimates a congestion situation in each of a plurality of areas in the station. The station congestion estimating unit 20 outputs station congestion information indicating the congestion situation in each of the areas in the station estimated by the station congestion estimating unit 20.

Specifically, for example, the station congestion estimating unit 20 acquires sensor information output from each of the plurality of sensors 101, ..., and 10N and estimates the congestion situation in each of the plurality of areas in the station on the basis of the plurality of pieces of sensor information that has been acquired.

More specifically, for example, the station congestion estimating unit 20 has an image analysis function and estimates the congestion situation in each of the plurality of areas in the station by analyzing the sensor information by the image analysis function.

Since a method of estimating a congestion situation in a predetermined area on the basis of sensor information is well known, description thereof will be omitted.

The station congestion estimating unit 20 includes, for example, a computer having a processor and a memory or a processing circuit. The station congestion estimating unit 20 may be configured by a computer including a processor, a memory, and a processing circuit.

As the processor, for example, a central processing unit (CPU), a graphics processing unit (GPU), a microprocessor, a micro controller, or a digital signal processor (DSP) is used.

Meanwhile, as the memory, for example, a semiconductor memory or a magnetic disk is used. More specifically, as the memory, a random access memory (RAM), a read only memory (ROM), a flash memory, an erasable programmable read only memory (EPROM), or an electrically erasable programmable read-only memory (EEPROM), an SSD, or an HDD is used.

In addition, as the processing circuit, for example, an application specific integrated circuit (ASIC), a programmable logic device (PLD), a field-programmable gate array (FPGA), a system-on-a-chip (SoC), or a system large-scale integration (LSI) is used.

The guidance determining unit 30 includes, for example, a computer having a processor and a memory or a processing circuit. The guidance determining unit 30 may be configured by a computer having a processor, a memory, and a processing circuit.

The guidance determining unit 30 determines a mode of guiding station users on the basis of the station congestion information output by the station congestion estimating unit 20. The guidance determining unit 30 outputs guidance information indicating the mode determined by the guidance determining unit 30.

For example, in a case where there is a plurality of routes from a concourse to a platform, the guidance determining unit 30 sets some of the plurality of routes as a route to go from the concourse to the platform (hereinafter referred to as "boarding route") and sets the rest as a route to go from the platform to the concourse (hereinafter referred to as "alighting route"). The guidance determining unit 30 determines a mode of guiding the station users in such a way as to guide station users planning to board a train from the platform to the boarding route. Meanwhile, the guidance determining unit 30 determines the mode of guiding the station users in such a way as to guide station users who have alighted from a train to the alighting route.

The output generation unit 31 includes, for example, a computer having a processor and a memory or a processing circuit. The output generation unit 31 may be configured by a computer including a processor, a memory, and a processing circuit.

The output generation unit 31 generates an output signal for guiding the station users on the basis of the guidance information output by the guidance determining unit 30. The output generation unit 31 outputs the output signal generated by the output generation unit 31 to the output device 40.

The output device 40 is a display output device such as a display or a monitor or an audio output device such as a speaker.

The output device 40 acquires the output signal output from the output generation unit 31 and provides display output, sound output, or the like corresponding to the output signal that has been acquired.

That is, the output generation unit 31 outputs the output signal generated by the output generation unit 31 to the output device 40 and causes the output device 40 to provide the output corresponding to the output signal.

Specifically, for example, the output device 40 is installed in a ticket gate, the concourse, a passage or a staircase connecting the concourse and a platform, a platform, or the like, at a position that can be viewed by station users.

For example, the output device 40 provides display output or sound output such as "Those who take the train arriving at track number XX, please go left." or the like.

With the above configuration, the guidance system 1 can suppress confusion of station users in a station.

The station congestion estimating unit 20 preferably estimates a congestion situation in each of a plurality of areas on at least a platform. The station congestion estimating unit 20 outputs station congestion information indicating the congestion situation in each of the areas on the platform estimated by the station congestion estimating unit 20.

In addition, the guidance determining unit 30 preferably determines a mode of guiding the station users in such a way as to reduce local congestion on the platform on the basis of the station congestion information output by the station congestion estimating unit 20. The guidance determining unit 30 outputs guidance information indicating the mode determined by the guidance determining unit 30.

For example, the output device 40 provides display output or sound output such as "Those who take the train arriving at track number XX, please wait for the train at boarding place number YY." or the like.

With the above configuration, the guidance system 1 can equalize the number of station users who wait for a train to board on a platform across the entire platform while suppressing confusion of the station users on the platform. As a result, the guidance system 1 can prevent a station user from falling from the platform onto a railway track, for example.

In addition, with the above configuration, the guidance system 1 can equalize the number of station users who board the arriving train across cars or passenger doors of the train by equalizing the number of station users who wait for the train to board on the platform across the entire platform. As a result, the guidance system 1 can shorten the period required for the station users to board a train and thus can make it possible to operate trains without delay in accordance with a predetermined operation schedule.

In addition, with the above configuration, the guidance system 1 can prevent the station users waiting for a train to board on the platform from locally concentrating on the platform by equalizing the number of station users waiting for the train to board on the platform across the entire platform. As a result, the guidance system 1 can reduce droplet infection of bacteria, viruses, or the like.

As described above, the guidance system 1 may include the train congestion estimating unit 21.

The train congestion estimating unit 21 includes, for example, a computer having a processor and a memory or a processing circuit. The train congestion estimating unit 21 may be configured by a computer including a processor, a memory, and a processing circuit.

The train congestion estimating unit 21 estimates a congestion situation in each of a plurality of areas of a train scheduled to arrive at the station. The train congestion estimating unit 21 outputs train congestion information indicating the congestion situation in each of the areas of the train estimated by the train congestion estimating unit 21.

Specifically, for example, the train congestion estimating unit 21 acquires sensor information output from each of the plurality of sensors 10_1, . . . , and 10_N and estimates the congestion situation in each of the plurality of areas of the train scheduled to arrive at the station on the basis of the plurality of pieces of sensor information that has been acquired.

More specifically, for example, the train congestion estimating unit 21 has an image analysis function and estimates the congestion situation in each of the plurality of areas of the train scheduled to arrive at the station by analyzing the sensor information by the image analysis function.

Since a method of estimating the congestion situation in a predetermined area of the train on the basis of the sensor information is well known, description thereof will be omitted.

Note that the sensors 10 of sensors 10_1, . . . , and 10_N that output the sensor information to be acquired by the train congestion estimating unit 21 are imaging devices such as monitoring cameras that capture predetermined areas in the train scheduled to arrive at the station. For example, in a case where a sensor 10 is an imaging device, the sensor 10 may be installed in a train scheduled to arrive at the station or installed at a platform. For example, in a case where a sensor 10 is an imaging device installed at a platform, the sensor 10 may be installed at a platform of a station where the train has already arrived or installed at a platform of a station where the train is scheduled to arrive, among a plurality of stations where the train scheduled to arrive at the station stops.

Meanwhile, in a case where a sensor 10 is a weight sensor, the sensor 10 is installed in a train scheduled to arrive at the station.

In a case where the guidance system 1 includes the train congestion estimating unit 21, the guidance determining unit 30 determines a mode of guiding the station users on the basis of the station congestion information output by the station congestion estimating unit 20 and the train congestion information output by the train congestion estimating unit 21. The guidance determining unit 30 outputs guidance information indicating the mode determined by the guidance determining unit 30.

In this case, for example, the guidance determining unit 30 determines a mode of guiding the station users in such a way as to reduce, when station users to board a train scheduled to arrive at the station have actually boarded the train, local congestion in the train.

For example, the output device 40 provides display output or sound output such as "Those who take the train arriving at track number XX, please wait for the train at boarding place number YY and get on car number ZZ." or the like.

With the above configuration, the guidance system 1 can reduce local congestion in the train while suppressing confusion of station users on the platform.

For example, when the train scheduled to arrive arrives at the platform, station users planning to board the train board the train one after another. At this point, if station users planning to board attempt to board a congested car or a car, the surroundings of passenger doors of which are congested, the time required for all the station users who are planning to board to complete the boarding becomes long. That is, areas of the platform corresponding to the congested car or the car, the surroundings of passenger doors of which are congested are temporarily congested.

Therefore, in a case where the station congestion estimating unit 20 estimates the congestion situation in each of a plurality of areas on a platform and thereby outputs station congestion information indicating the estimated congestion situation in each of the areas on the platform, the guidance determining unit 30 preferably determines a mode of guiding the station users in such a way as to reduce local congestion on the platform when the train scheduled to arrive arrives at the platform on the basis of the station congestion information output by the station congestion estimating unit 20 and the train congestion information output by the train congestion estimating unit 21.

For example, the output device 40 provides display output or sound output such as "Those who take the train arriving at track number XX, please wait for the train at boarding place number YY and get on car number ZZ." or the like.

With the guidance determining unit 30 determining the mode in such a way as to guide the station users in such a way as to reduce local congestion on the platform when the train scheduled to arrive arrives at the platform on the basis of the station congestion information and the train congestion information, the guidance system 1 can reduce the time required for all the station users planning to board to complete the boarding while suppressing confusion of the station users on the platform. As a result, the guidance system 1 can make it possible to operate the train without delay in accordance with a predetermined operation schedule.

In addition to the function of estimating the congestion situation in each of the plurality of areas of the train scheduled to arrive at the station, the train congestion estimating unit 21 may further have a function of estimating the number of station users who alight from the train at the station at which the train is scheduled to arrive, among the passengers on the train scheduled to arrive.

For example, on the basis of sensor information acquired in the past, the train congestion estimating unit 21 calculates, for each car or each passenger door of a train that has arrived in the same period of time in the past, the number of station users who have alighted from the car or the passenger door. The train congestion estimating unit 21 estimates, for each car or each passenger door of the train scheduled to arrive at the station, the number of station users who alight at the station, at which the train is scheduled to arrive, from the car or the passenger door, on the basis of the number of station users who have alighted from the corresponding car or the corresponding passenger door of the train that has arrived in the same period of time in the past that has been calculated by the train congestion estimating unit 21.

The train congestion estimating unit 21 outputs train alighting information indicating the number of station users who alight at the station, scheduled to arrive at, from the train scheduled to arrive at the station for each car or each passenger door, which has been estimated by the train congestion estimating unit 21.

For example, when a train scheduled to arrive arrives at the platform, first, station users onboard the train alight from the train. At this point, the station users who have alighted from the train and station users planning to board the train and to board trains scheduled to arrive later are on the platform.

In a case where congestion occurs in a local area on the platform due to the station users who have alighted from the train and the station users planning to board a train, the time required for all the station users to complete boarding and alighting from the train becomes long.

Therefore, on the basis of the station congestion information output by the station congestion estimating unit 20 and the train congestion information and the train alighting information output by the train congestion estimating unit 21, the guidance determining unit 30 determines a mode of guiding the station users in such a way as to reduce local congestion on the platform when the train scheduled to arrive arrives at the platform.

For example, the output device 40 provides display output or sound output such as "Those who take the train arriving at track number XX, please wait for the train at boarding place number YY and get on car number ZZ." or the like.

With the guidance determining unit 30 determining the mode in such a way as to guide the station users in such a way as to reduce local congestion on the platform when the train scheduled to arrive arrives at the platform on the basis of the station congestion information, the train congestion information, and the train alighting information, the guidance system 1 can reduce the time required for all the station users planning to board the train to complete the boarding while suppressing confusion of the station users on the platform. As a result, the guidance system 1 can make it possible to operate the train without delay in accordance with a predetermined operation schedule.

As described above, the guidance system 1 may include the travel control unit 50 and the movable object 51.

The travel control unit 50 includes, for example, a computer having a processor and a memory or a processing circuit. The travel control unit 50 may be configured by a computer including a processor, a memory, and a processing circuit.

The movable object 51 is a pole-shaped robot that can travel autonomously. The movable object 51 forms a lane for guiding station users by traveling in the station. The movable object 51 acquires travel control information and travels on the basis of the travel control information that has been acquired.

The movable object 51 preferably has the center of gravity at a low position in order to prevent the movable object 51 from falling down even when a station user comes into contact with the movable object 51.

The guidance system 1 may include a plurality of movable objects 51. In addition, some movable objects 51 of the plurality of movable objects 51 may be formed by connecting movable objects 51 to each other using a long object having a string shape, a band shape, or a rod shape.

The travel control unit 50 controls the travel of the movable object 51. Specifically, the travel control unit 50 generates travel control information indicating control for causing the movable object 51 to travel on the basis of the guidance information output by the guidance determining unit 30. The travel control unit 50 outputs the travel control information generated by the travel control unit 50 to the movable object 51.

Specifically, for example, the travel control unit 50 generates and outputs travel control information for causing the movable object 51 to travel so that the movable object 51 forms a lane through which station users planning to board a train scheduled to arrive pass and a lane through which station users who alight from the train that has arrived pass, in a passage connecting a ticket gate or a concourse and a platform.

For example, the travel control unit 50 generates pieces of travel control information which correspond to the respective plurality of movable objects 51 and outputs the pieces of travel control information which correspond to the respective plurality of movable objects 51 to the plurality of movable objects 51.

The guidance system 1 may include a plurality of travel control units 50 corresponding to the respective plurality of movable objects 51. In a case where the guidance system 1 includes the plurality of travel control units 50, the travel control units 50 may be installed in housings of the respective plurality of movable objects 51.

With the travel control unit 50 causing the movable object 51 to travel on the basis of the guidance information and causing the movable object 51 to form lanes for guiding station users traveling in the station, the guidance system 1 can suppress confusion of the station users in the station.

As described above, the guidance system 1 may include the waiting position determining unit 60 and the waiting position transmitting unit 61.

The waiting position determining unit 60 and the waiting position transmitting unit 61 are each configured by, for example, a computer having a processor and a memory or a processing circuit. The waiting position determining unit 60 and the waiting position transmitting unit 61 may be each configured by a computer including a processor, a memory, and a processing circuit.

The waiting position determining unit 60 determines the positions on the platform where respective station users who board the train scheduled to arrive wait to board the train to board on the basis of the guidance information output by the guidance determining unit 30. The waiting position determining unit 60 generates waiting position information indicating the position determined by the waiting position determining unit 60 for each of the station users.

For example, each of the station users sets scheduled train information indicating a train to board in advance in a mobile terminal 62 possessed by the station user. The waiting position determining unit 60 acquires the scheduled train information from the mobile terminals 62 possessed by the respective station users. The waiting position determining unit 60 generates waiting position information for each of the station users on the basis of the guidance information and the scheduled train information.

A method by which the waiting position determining unit 60 acquires the scheduled train information is not limited to the method by which the scheduled train information set in advance in the mobile terminals 62 by the station users is acquired from the mobile terminals 62. The waiting position determining unit 60 may acquire the scheduled train information by the following methods or the like.

For example, the waiting position determining unit 60 acquires, from the mobile terminals 62 held by the respective station users, station user position information indicating positions of the mobile terminals 62, that is, positions of the station users holding the mobile terminals 62. The waiting position determining unit 60 estimates a train that a station user is planning to board on the basis of the station user position information acquired by the waiting position determining unit 60. Specifically, for example, the waiting position determining unit 60 specifies a train that the station user can board after arriving at the platform on the basis of the station user position information, thereby estimating a train that the station user is planning to board. The waiting position determining unit 60 acquires, as the scheduled train information, information indicating the train to board that has been estimated by the waiting position determining unit 60.

Furthermore, for example, the waiting position determining unit 60 acquires, from the mobile terminals 62 held by the respective station users, station user position information indicating positions of the mobile terminals 62, that is, positions of the station users holding the mobile terminals 62. The waiting position determining unit 60 specifies trains which a station user has boarded in the past on the basis of station user position information acquired in the past by the waiting position determining unit 60. The waiting position determining unit 60 estimates a train that the station user is planning to board by statistically processing information indicating the trains which the station user has boarded in the past and which are specified by the waiting position determining unit 60.

The waiting position transmitting unit 61 transmits the waiting position information generated for each station user by the waiting position determining unit 60 to a mobile terminal 62 held by the station user. Specifically, the waiting position transmitting unit 61 transmits, to a mobile terminal 62 held by each station user, waiting position information corresponding to the station user.

A mobile terminal 62 held by each station user acquires the waiting position information transmitted by the waiting position transmitting unit 61 and outputs the waiting position information by display or speech.

Each station user can check a position on the platform to wait at for boarding a train to board by the display output or the speech output by the mobile terminal 62.

With the above configuration, the guidance system 1 can equalize the number of station users who wait for a train on a platform across the entire platform while suppressing confusion of the station users in the station.

In addition, with the above configuration, the guidance system 1 can prevent the station users waiting for a train to board on the platform from locally concentrating on the platform by equalizing the number of station users waiting for the train to board on the platform across the entire platform. As a result, the guidance system 1 can reduce droplet infection of bacteria, viruses, or the like.

The operation of the guidance system 1 according to the first embodiment will be described with reference to FIG. 2.

FIG. 2 is a flowchart illustrating an example of processing of the guidance system 1 according to the first embodiment. The guidance system 1 repeatedly executes, for example, processing of the flowchart.

First, in step ST201, the station congestion estimating unit 20 estimates a congestion situation in each of a plurality of areas in a station.

Next, in step ST202, the station congestion estimating unit 20 outputs station congestion information.

Next, in step ST203, the train congestion estimating unit 21 estimates a congestion situation in each of a plurality of areas of the train scheduled to arrive at the station.

Next, in step ST204, the train congestion estimating unit 21 outputs train congestion information.

Next, in step ST205, the guidance determining unit 30 determines a mode of guiding station users.

Next, in step ST206, the guidance determining unit 30 outputs guidance information.

Next, in step ST207, the output generation unit 31 generates an output signal.

Next, in step ST208, the output generation unit 31 outputs the output signal.

Next, in step ST209, the travel control unit 50 generates travel control information.

Next, in step ST210, the travel control unit 50 outputs the travel control information.

Next, in step ST211, the waiting position determining unit 60 determines the position on the platform where each station user waits.

Next, in step ST212, the waiting position determining unit 60 generates waiting position information for each station user.

Next, in step ST213, the waiting position transmitting unit 61 transmits the waiting position information to the mobile terminals 62 held by respective station users.

After step ST213, the guidance system 1 ends the processing of the flowchart. After ending the processing of the flowchart, the guidance system 1 returns to step ST201 and repeatedly executes the processing of the flowchart.

Note that, in a case where the guidance system 1 does not include the train congestion estimating unit 21, the processing of steps ST203 and ST204 is omitted.

In addition, in a case where the guidance system 1 does not include the travel control unit 50 and the movable object 51, the processing of steps ST209 and ST210 is omitted.

In addition, in a case where the guidance system 1 does not include the waiting position determining unit 60 and the waiting position transmitting unit 61, the processing from step ST211 to step ST213 is omitted.

Furthermore, as long as the processing of step ST207 is executed before the processing of step ST208, the processing of step ST209 is executed before the processing of step ST210, the processing of step ST211 is executed before the processing of step ST212, and the processing of step ST212 is executed before the processing of step ST213, the processing from step ST207 to step ST213 may be in any order.

As described above, the guidance system 1 according to the first embodiment includes: the station congestion estimating unit 20 to estimate congestion situations in respective areas in a station and to output station congestion information indicating the estimated congestion situations in the respective areas in the station; the guidance determining unit 30 to determine a mode of guiding station users on the basis of the station congestion information output by the station congestion estimating unit 20 and to output guidance information indicating the mode that has been determined; and the output generation unit 31 to generate an output signal for guiding the station users on the basis of the guidance information output by the guidance determining unit 30, to output the output signal that has been generated to the output device 40, and to cause the output device 40 to provide output corresponding to the output signal.

With this configuration, the guidance system 1 can suppress confusion of station users in the station.

In addition, in the guidance system 1 according to the first embodiment having the above-described configuration, the station congestion estimating unit 20 outputs, by estimating the congestion situations in the respective areas on at least a platform, the station congestion information indicating the estimated congestion situations in the respective areas on the platform. Furthermore, the guidance determining unit 30 determines a mode of guiding the station users in such a way as to reduce local congestion on the platform on the basis of the station congestion information output by the station congestion estimating unit 20 and outputs the guidance information indicating the mode that has been determined.

With this configuration, the guidance system 1 can equalize the number of station users who wait for a train to board on a platform across the entire platform while suppressing confusion of the station users on the platform. As a result, the guidance system 1 can prevent a station user from falling from the platform onto a railway track, for example.

In addition, with this configuration, the guidance system 1 can equalize the number of station users who board the arriving train across cars or passenger doors of the train by equalizing the number of station users who wait for the train to board on the platform across the entire platform. As a result, the guidance system 1 can shorten the period required for the station users to board a train and can make it possible to operate trains without delay in accordance with a predetermined operation schedule.

In addition, with this configuration, the guidance system 1 can prevent the station users waiting for a train to board on the platform from locally concentrating on the platform by equalizing the number of station users waiting for the train to board on the platform across the entire platform. As a result, the guidance system 1 can reduce droplet infection of bacteria, viruses, or the like.

Moreover, the guidance system 1 according to the first embodiment includes, in addition to the above configuration, the train congestion estimating unit 21 that estimates congestion situations in respective areas of a train scheduled to arrive at the station and outputs train congestion information indicating the estimated congestion situations in the respective areas of the train. Furthermore, the guidance determining unit 30 determines the mode of guiding station users on the basis of the station congestion information output by the station congestion estimating unit 20 and the train congestion information output by the train congestion estimating unit 21 and outputs guidance information indicating the mode that has been determined.

With this configuration, the guidance system 1 can reduce local congestion in the train while suppressing confusion of station users on the platform.

In addition, in the guidance system 1 according to the first embodiment having the above configuration, the station congestion estimating unit 20 outputs, by estimating the congestion situations in the respective areas on at least the platform, the station congestion information indicating the estimated congestion situations in the respective areas on the platform. Furthermore, the guidance determining unit 30 determines the mode of guiding the station users in such a way as to reduce local congestion on the platform when the train scheduled to arrive arrives at the platform on the basis of the station congestion information output by the station congestion estimating unit 20 and the train congestion information output by the train congestion estimating unit 21 and outputs the guidance information indicating the mode that has been determined.

With this configuration, the guidance system 1 can reduce the time required for all the station users planning to board to complete boarding while suppressing the confusion of the station users on the platform. As a result, the guidance system 1 can make it possible to operate the train without delay in accordance with a predetermined operation schedule.

In addition, the guidance system 1 according to the first embodiment includes, in addition to the above configuration, the travel control unit 50 that controls the travel of the movable object 51, which is capable of autonomously travelling and forms a lane for guiding station users by traveling in the station. The travel control unit 50 generates travel control information indicating control for causing the movable object 51 to travel on the basis of the guidance information output by the guidance determining unit 30 and outputs the travel control information that has been generated.

With this configuration, the guidance system 1 can suppress confusion of station users in the station.

In addition, the guidance system 1 according to the first embodiment includes: in addition to the above configuration, the waiting position determining unit 60 that determines a position on the platform where each of the plurality of station users boarding the train scheduled to arrive waits in order to board the train to board on the basis of the guidance information output by the guidance determining unit 30 and generates waiting position information indicating the position that has been determined for each station user; and the waiting position transmitting unit 61 that transmits, to the mobile terminal 62 held by each station user, the waiting position information generated for the station user by the waiting position determining unit 60 and corresponding to the station user.

With this configuration, the guidance system 1 can equalize the number of station users who wait for a train on a platform across the entire platform while suppressing confusion of the station users in the station.

In addition, with this configuration, the guidance system 1 can prevent the station users waiting for a train to board on the platform from locally concentrating on the platform by equalizing the number of station users waiting for the train to board on the platform across the entire platform. As a result, the guidance system 1 can reduce droplet infection of bacteria, viruses, or the like.

Moreover, within the scope of the disclosure, the present disclosure can include a modification of any component of the embodiment or an omission of any component of the embodiment.

INDUSTRIAL APPLICABILITY

The guidance system of the present disclosure can be applied to a station for boarding and alighting from a train.

REFERENCE SIGNS LIST

1: guidance system, 10, 101, . . . , 10N: sensor, 20: station congestion estimating unit, 21: train congestion estimating unit, 30: guidance determining unit, 31: output generation unit, 40: output device, 50: travel control unit, 51: movable object, 60: waiting position determining unit, 61: waiting position transmitting unit, 62: mobile terminal, 70: network

The invention claimed is:

1. A guidance system comprising: station congestion estimating circuitry to estimate congestion situations in respective areas in a station and to output station congestion information indicating the estimated congestion situations in the respective areas in the station; guidance determining circuitry to determine a mode of guiding a station user on a platform on a basis of the station congestion information output by the station congestion estimating circuitry and to output guidance information indicating the mode that has been determined; output generation circuitry to generate an output signal for guiding the station user on the platform on a basis of the guidance information output by the guidance determining circuitry, to output the output signal that has been generated to an output device, and to cause the output device to provide output corresponding to the output signal; and train congestion estimating circuitry to estimate congestion situations in respective areas of a train scheduled to arrive at the station and to output train congestion information indicating the estimated congestion situations in the respective areas of the train, wherein the guidance determining circuitry determines the mode of guiding the station user on the platform on a basis of the station congestion information output by the station congestion estimating circuitry and the train congestion information output by the train congestion estimating circuitry and outputs the guidance information indicating the mode that has been determined, the station congestion estimating circuitry outputs, by estimating the congestion situations in the respective areas on at least the platform, the station congestion information indicating the estimated congestion situations in the respective areas on the platform, and the guidance determining circuitry determines the mode of guiding the station user on the platform in such a way as to reduce local congestion on the platform when the train scheduled to arrive arrives at the platform on a basis of the station congestion information output by the station congestion estimating circuitry and the train congestion information output by the train congestion estimating circuitry and outputs the guidance information indicating the mode that has been determined.

2. A guidance method comprising: estimating congestion situations in respective areas in a station and outputting station congestion information indicating the estimated congestion situations in the respective areas in the station; determining a mode of guiding a station user on a platform on a basis of the station congestion information and outputting guidance information indicating the mode that has been determined; generating an output signal for guiding the station user on the platform on a basis of the guidance information, outputting the output signal that has been generated to an output device, and causing the output device to provide output corresponding to the output signal; estimating congestion situations in respective areas of a train scheduled to arrive at the station and outputting train congestion information indicating the estimated congestion situations in the respective areas of the train; and determining the mode of guiding the station user on the platform on a basis of the station congestion information and the train congestion information and outputting the guidance information indicating the mode that has been determined, wherein the estimating congestion situations includes estimating the congestion situations in the respective areas on at least the platform, the station congestion information indicating the estimated congestion situations in the respective areas on the platform, and the determining the mode of guiding the station includes reducing local congestion on the platform when the train scheduled to arrive arrives at the platform on a basis of the station congestion information and the train congestion information and outputting the guidance information indicating the mode that has been determined.

* * * * *